United States Patent
Han et al.

(10) Patent No.: US 11,973,227 B2
(45) Date of Patent: Apr. 30, 2024

(54) ELECTRODE BINDER COMPOSITION FOR SECONDARY BATTERY ELECTRODE AND ELECTRODE MIXTURE INCLUDING THE SAME

(71) Applicant: LG Chem, Ltd., Seoul (KR)

(72) Inventors: Seon Hee Han, Daejeon (KR); Min Ah Kang, Daejeon (KR); Dong Jo Ryu, Daejeon (KR); Jung Sup Han, Daejeon (KR); Jeong Man Son, Daejeon (KR); Cheolhoon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 874 days.

(21) Appl. No.: 16/978,884

(22) PCT Filed: Nov. 1, 2019

(86) PCT No.: PCT/KR2019/014718
§ 371 (c)(1),
(2) Date: Sep. 8, 2020

(87) PCT Pub. No.: WO2020/096287
PCT Pub. Date: May 14, 2020

(65) Prior Publication Data
US 2020/0411872 A1  Dec. 31, 2020

(30) Foreign Application Priority Data
Nov. 7, 2018  (KR) .................. 10-2018-0136197

(51) Int. Cl.
| | | |
|---|---|---|
| *H01M 4/62* | (2006.01) | |
| *C08L 9/08* | (2006.01) | |
| *H01M 10/0525* | (2010.01) | |
| H01M 50/449 | (2021.01) | |
| H01M 50/451 | (2021.01) | |

(52) U.S. Cl.
CPC .............. *H01M 4/622* (2013.01); *C08L 9/08* (2013.01); *H01M 10/0525* (2013.01); *H01M 50/449* (2021.01); *H01M 50/451* (2021.01)

(58) Field of Classification Search
CPC ............ H01M 50/451; H01M 50/449; H01M 10/0525; H01M 4/622; C08L 9/08
See application file for complete search history.

(56) References Cited

U.S. PATENT DOCUMENTS

| | | |
|---|---|---|
| 8,771,880 B2 | 7/2014 | Fukui et al. |
| 10,033,042 B2 | 7/2018 | Fukumine et al. |
| 2012/0258348 A1 | 10/2012 | Hayakawa et al. |
| 2012/0258349 A1 | 10/2012 | Hayakawa et al. |
| 2012/0258350 A1* | 10/2012 | Fukui .................. H01M 50/491 525/61 |
| 2012/0330589 A1 | 12/2012 | Ryu et al. |
| 2013/0171521 A1* | 7/2013 | Sugimoto ............... C08L 85/02 429/211 |
| 2015/0050555 A1* | 2/2015 | Fukumine ........... H01M 10/052 429/217 |
| 2015/0171392 A1 | 6/2015 | Hayakawa et al. |
| 2016/0301076 A1 | 10/2016 | Shen et al. |
| 2018/0090764 A1 | 3/2018 | Fukumine et al. |
| 2018/0351177 A1* | 12/2018 | Kang ..................... C08L 15/00 |

FOREIGN PATENT DOCUMENTS

| | | | |
|---|---|---|---|
| CN | 101156264 | A | 4/2008 |
| CN | 102746813 | A | 10/2012 |
| CN | 103155248 | A | 6/2013 |
| CN | 104137311 | A | 11/2014 |
| CN | 104272508 | A | 1/2015 |
| CN | 107325225 | A | 11/2017 |
| CN | 107641170 | A | 1/2018 |
| JP | 2014123550 | | 7/2014 |
| KR | 20120014634 | A | 2/2012 |
| KR | 20120113676 | A | 10/2012 |
| KR | 102067562 | * | 4/2015 |
| KR | 20150044839 | A | 4/2015 |
| KR | 101532815 | B1 | 6/2015 |
| KR | 101634416 | B1 | 6/2016 |
| KR | 101762604 | B1 | 7/2017 |
| KR | 20170076592 | A | 7/2017 |
| KR | 20170117194 | A | 10/2017 |
| WO | 2006107173 | A1 | 10/2006 |
| WO | 2014024937 | A1 | 2/2014 |

OTHER PUBLICATIONS

KR102067562 MT (Year: 2015).*
JPO Decision to grant a Patent (Year: 2021).*
EPO Decision to grant European Patent (Year: 2023).*
SIPO Decision to grant a Patent (Year: 2023).*
Extended European Search Report including Written Opinion for Application No. 19883206.5 dated Apr. 28, 2021, 7 pages.
International Search Report for PCT/KR2019/014718 dated Feb. 18, 2020; 3 pages.

* cited by examiner

*Primary Examiner* — Alexander Usyatinsky
(74) *Attorney, Agent, or Firm* — Lerner David LLP

(57) ABSTRACT

Provided are a binder composition for a secondary battery electrode, and an electrode mixture including the same, and more particularly, a binder composition for a secondary battery electrode capable of providing excellent binding strength for an active material and an electrode while having excellent latex stability, thereby improving performance of a secondary battery, and an electrode mixture including the same.

18 Claims, No Drawings

ELECTRODE BINDER COMPOSITION FOR SECONDARY BATTERY ELECTRODE AND ELECTRODE MIXTURE INCLUDING THE SAME

CROSS-REFERENCE TO RELATED APPLICATIONS

This application is a national phase entry under 35 U.S.C. § 371 of International Application No. PCT/KR2019/014718 filed Nov. 1, 2019, which claims priority from Korean Patent Application No. 10-2018-0136197 filed Nov. 7, 2018, all of which are incorporated herein by reference.

FIELD OF THE INVENTION

The present invention relates to a binder composition for a secondary battery electrode and an electrode mixture including the same.

DESCRIPTION OF THE RELATED ART

A dramatic increase in the use of fossil fuels results in an increasing demand for the use of alternative energy or clean energy, and as part of this, the most actively researched fields are fields of secondary batteries using electrochemistry. Recently, as technical development and demands for portable devices such as portable computers, cellular phones, cameras, etc. have been increasing, a demand for a secondary battery as an energy source has been rapidly increasing. Among the secondary batteries, lithium secondary batteries having high energy density and operation potential and having a long cycle lifespan and a low self-discharge rate have been much studied such that the batteries have been commercialized and widely used. In addition, as interest in environmental problems is increasing, electric vehicles or hybrid electric vehicles capable of replacing fossil fuel engines which are one of the main causes of air pollution have been actively studied, and lithium secondary batteries are being used as a power source of the electric vehicles, hybrid electric vehicles, etc. Generally, in the lithium secondary battery, a lithium transition metal oxide is used as a positive electrode active material, and a graphite-based material is used as a negative electrode active material. An electrode of the lithium secondary battery is manufactured by mixing the active material with a binder component, dispersing this mixture in a solvent to prepare a slurry, and then applying the slurry on the surface of a current collector to form a mixture layer. In general, lithium secondary batteries are charged and discharged through a process in which lithium ions of a positive electrode are repeatedly intercalated and deintercalated at a negative electrode. During this repeated process, a bond between electrode active materials or conductive materials becomes loose and contact resistance between particles increases. As a result, ohmic resistance of an electrode may increase. Accordingly, since a binder used in the electrode is required to perform buffering action for expansion and contraction of the electrode active material due to intercalation and deintercalation of lithium ions in the electrode while maintaining excellent binding strength between the electrode active material and the current collector. In particular, a natural graphite having a theoretical discharge capacity of 372 mAh/g is frequently used with a material having high discharge capacity such as silicon, tin, or silicon-tin alloy, in order to increase discharge capacity of the electrode. Accordingly, volume expansion of the material remarkably increases as charge and discharge proceed, and thus a negative electrode material is desorbed. As a result, there are problems in that battery capacity is dramatically decreased and lifespan is shortened. Further, lithium ion batteries may undergo a swelling phenomenon, in which they swell due to gas generated when an electrolyte inside the batteries is decomposed. As the temperature of batteries is elevated with the use of electronic products, the decomposition of the electrolyte is promoted, and thus the swelling phenomenon is accelerated, which may cause a reduction in stability of the batteries. Accordingly, there is an urgent need to study a binder and an electrode material which may have excellent adhesive strength so as to prevent separation between electrode active materials or separation between an electrode active material and a current collector while maintaining structural stability of the electrode even after repeated charge/discharge cycles.

SUMMARY OF THE INVENTION

Technical Problem

The present invention provides a binder composition for a secondary battery electrode, and the binder composition is capable of providing excellent binding strength for an active material and an electrode while having excellent latex stability at the same time.

Further, the present invention provides a method of preparing the binder composition for a secondary battery electrode.

Further, the present invention provides a secondary battery electrode mixture including the binder composition for a secondary battery electrode.

Further, the present invention provides a secondary battery electrode including the secondary battery electrode mixture.

Further, the present invention provides a secondary battery including the secondary battery electrode.

Technical Solution

To solve the above problems, the present invention provides a binder composition for a secondary battery electrode, the binder composition including a copolymer,
the copolymer including:
a) a first repeating unit derived from an aliphatic conjugated diene-based first monomer;
a second repeating unit derived from one or more second monomers selected from the group consisting of b1) an aromatic vinyl-based monomer, b2) an alkyl (meth)acrylic acid ester-based monomer, b3) a (meth)acrylamide-based monomer, b4) an alkenyl cyanide monomer, and b5) an unsaturated carboxylic acid-based monomer; and
c) a third repeating unit derived from a third monomer represented by the following Chemical Formula 1,
wherein the third repeating unit is included in an amount of 0.5% by weight to 0.95% by weight with respect to the total amount of the first repeating unit, the second repeating unit, and the third repeating unit:

[Chemical Formula 1]

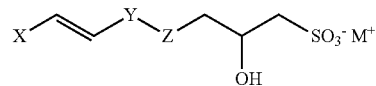

in Chemical Formula 1,
M is an alkali metal,
X is hydrogen or a methyl group,
Y is alkylene having 1 to 10 carbon atoms, and
Z is an oxygen atom or NR, wherein R is hydrogen or an alkyl group having 1 to 10 carbon atoms.

Further, the present invention provides a method of preparing the binder composition for a secondary battery electrode.

Further, the present invention provides a secondary battery electrode mixture including the binder composition for a secondary battery electrode and an electrode active material.

Further, the present invention provides a secondary battery electrode including an electrode mixture layer including the secondary battery electrode mixture and an electrode current collector.

Further, the present invention provides a secondary battery including the secondary battery electrode.

Advantageous Effects

A binder composition for a secondary battery electrode according to the present invention may provide excellent binding strength for an active material and an electrode while having excellent latex stability at the same time, thereby improving performance of a secondary battery employing the same.

DETAILED DESCRIPTION OF THE EMBODIMENTS

In the present invention, the terms "first", "second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics, numbers, steps, components, or combinations thereof, and do not exclude the existence or the possibility of addition of one or more different characteristics, numbers, steps, components, or combinations thereof beforehand.

In the present invention, when a layer or an element is mentioned to be formed "on" or "above" layers or elements, it means that each layer or element is directly formed on the layers or elements, or other layers or elements may be formed between the layers, subjects, or substrates.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

(Binder Composition for Secondary Battery Electrode)

A binder composition for a secondary battery electrode according to one aspect of the present invention includes a copolymer,
the copolymer including:
a) a first repeating unit derived from an aliphatic conjugated diene-based first monomer;
a second repeating unit derived from one or more second monomers selected from the group consisting of b1) an aromatic vinyl-based monomer, b2) an alkyl (meth)acrylic acid ester-based monomer, b3) a (meth)acrylamide-based monomer, b4) an alkenyl cyanide monomer, and b5) an unsaturated carboxlic acid-based monomer; and
c) a third repeating unit derived from a third monomer represented by the following Chemical Formula 1,
wherein the third repeating unit in the copolymer is included in an amount of 0.5% by weight to 0.95% by weight with respect to the total amount of the first repeating unit, the second repeating unit, and the third repeating unit:

[Chemical Formula 1]

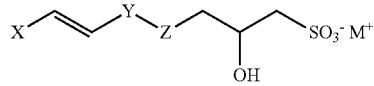

in Chemical Formula 1,
M is an alkali metal,
X is hydrogen or a methyl group,
Y is alkylene having 1 to 10 carbon atoms, and
Z is an oxygen atom or NR, wherein R is hydrogen or an alkyl group having 1 to 10 carbon atoms.

The binder composition for a secondary battery electrode according to one embodiment of the present invention includes a copolymer including the third repeating unit derived from the third monomer having a specific structure which is represented by Chemical Formula 1, specifically, the third repeating unit derived from a monomer having a hydroxypropyl sulfonate group at its end, together with the first repeating unit derived from the aliphatic conjugated diene-based first monomer and the second repeating unit derived from the above-described second monomer.

The copolymer including the third repeating unit derived from the third monomer having the hydroxypropyl sulfonate group at its end may enhance binding strength between electrode active materials and/or between active material-electrode current collector due to the hydroxy group and the sulfonate group. More particularly, the hydroxy group and the sulfonate group located at the side chain or the end of the copolymer may form a chemical bond with the metal surface of the electrode current collector, and thus when the copolymer including the third repeating unit is used as a binder, binding strength with respect to the electrode mixture layer and the electrode current collector may be improved.

Further, when the copolymer is prepared by emulsion polymerization, the third monomer represented by Chemical Formula 1 includes an alkenyl group in the molecule, and directly participates in the polymerization reaction to provide stability for the particle surface, thereby improving mechanical stability of the copolymer finally produced.

Further, the third repeating unit is included in an amount of 0.5% by weight to 0.95% by weight with respect to the total amount of the first repeating unit, the second repeating unit, and the third repeating unit. As used herein, the third repeating unit is included in an amount of 0.5% by weight to 0.95% by weight with respect to the total amount of the first repeating unit, the second repeating unit, and the third repeating unit means that the copolymer is prepared by emulsion polymerization of the first monomer, the second monomer, and the third monomer, and at this time, the third monomer is used in an amount of 0.5% by weight to 0.95% by weight with respect to the total amount of the above described first monomer, second monomer, and third monomer. In the copolymer, when the third repeating unit is included in an amount of less than 0.5% by weight, the effect of improving stability by the third repeating unit may be negligible or absent, and when the third repeating unit is included in an amount of more than 0.95% by weight, coagulum may increase or adhesive strength of the mixture layer including the same with respect to the electrode current collector may decrease.

Hereinafter, each repeating unit of the binder composition for a secondary battery electrode according to one embodiment of the present invention will be described in more detail.

The first repeating unit is derived from an aliphatic conjugated diene-based first monomer. Specifically, the first repeating unit is a structural unit of the copolymer, which is formed by introducing the aliphatic conjugated diene-based monomer during polymerization. When the first repeating unit derived from the aliphatic conjugated diene-based monomer is included in the copolymer, the binder according to the present invention may prevent an electrolyte swelling phenomenon at a high temperature, may have elasticity by a rubber component to reduce the thickness of the electrode, may reduce a gas generation phenomenon, and may also improve adhesion so as to maintain binding strength between the electrode active material and the current collector.

As the first monomer which is the aliphatic conjugated diene-based monomer, an aliphatic conjugated diene-based compound having 2 to 20 carbon atoms may be used. For non-limiting example, the aliphatic conjugated diene-based first monomer may be one or more selected from the group consisting of 1,3-butadiene, 2-methyl-1,3-butadiene, 2,3-dimethyl-1,3-butadiene, 1,2-dimethyl-1,3-butadiene, 1,4-dimethyl-1,3-butadiene, 1-ethyl-1,3-butadiene, 2-phenyl-1,3-butadiene, 1,3-pentadiene, 1,4-pentadiene, 3-methyl-1,3-pentadiene, 4-methyl-1,3-pentadiene, 2,4-dimethyl-1,3-pentadiene, 3-ethyl-1,3-pentadiene, 1,3-hexadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, and 7-methyl-1,6-octadiene. As the aliphatic conjugated diene-based first monomer, 1,3-butadiene may be preferably used.

The first repeating unit may be included in an amount of 0.1% by weight to 60% by weight with respect to the total amount of the first repeating unit, the second repeating unit, and the third repeating unit. In other words, during preparation of the copolymer, the first monomer may be used in an amount of 0.1% by weight to 60% by weight with respect to the total amount of the first monomer, the second monomer, and the third monomer. For example, the first repeating unit may be included in an amount of 10% by weight or more, 15% by weight or more, 20% by weight or more, or 30% by weight or more, or 58% by weight or less, 55% by weight or less, 53% by weight or less, or 50% by weight or less with respect to the total amount of the first repeating unit, the second repeating unit, and the third repeating unit. When the first repeating unit is included in an amount of more than 60% by weight in the copolymer, there is a problem in that the strength of the binder decreases or the yield of the reactants decreases.

Further, the second repeating unit is derived from one or more, preferably, three or more second monomers selected from the group consisting of b1) an aromatic vinyl-based monomer, b2) an alkyl (meth)acrylic acid ester-based monomer, b3) a (meth)acrylamide-based monomer, b4) an alkenyl cyanide monomer, and b5) an unsaturated carboxylic acid-based monomer. Specifically, the second repeating unit corresponds to a structural unit of the copolymer, which is formed by introducing the above-described second monomers during polymerization.

The aromatic vinyl-based monomer may be one or more selected from the group consisting of styrene, α-methylstyrene, β-methylstyrene, p-t-butylstyrene, chlorostyrene, vinyl benzoic acid, methyl vinyl benzoic acid, vinyl naphthalene, chloromethylstyrene, hydroxymethyl styrene, and divinyl benzene, preferably, styrene.

Further, the alkyl (meth)acrylate-based monomer may be one or more selected from the group consisting of methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, laurylacrylate, serylacrylate, stearylacrylate, lauryl methacrylate, cetyl methacrylate, and stearyl methacrylate, preferably, methyl methacrylate.

Further, the (meth)acrylamide-based monomer may be one or more selected from the group consisting of acrylamide, N-methylol acrylamide, N-butoxy methylacrylamide, methacrylamide, N-methylol methacrylamide, and N-butoxy methylmethacrylamide.

Further, the alkenyl cyanide monomer which is a monomer including both an ethylenically unsaturated group and a nitrile group in the molecule may include, for example, acrylonitrile, methacrylonitrile, allyl cyanide, etc.

Further, the unsaturated carboxylic acid-based monomer may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

Specifically, the second monomer may be three or more selected from the group consisting of b1) the aromatic vinyl-based monomer, b2) the alkyl (meth)acrylic acid ester-based monomer, and b5) the unsaturated carboxylic acid-based monomer. Preferably, the second monomer may be b1) styrene, b2) methyl methacrylate, and b5) acrylic acid and itaconic acid.

The second repeating unit may be included in an amount of 39% by weight to 99.4% by weight with respect to the total amount of the first repeating unit, the second repeating unit, and the third repeating unit. In other words, during preparation of the copolymer, the second monomer may be used in an amount of 39% by weight to 99.4% by weight with respect to the total amount of the first monomer, the second monomer, and the third monomer. For example, the second repeating unit may be included in an amount of 41% by weight or more, 44% by weight or more, 46% by weight or more, or 49% by weight or more, or 89.5% by weight or less, 84.5% by weight or less, 79.5% by weight or less, or 69.5% by weight or less with respect to the total amount of the first repeating unit, the second repeating unit, and the third repeating unit. When the second repeating unit is included in an amount of less than 39% by weight in the copolymer, there is a problem in that the strength of the binder decreases or affinity to an electrolytic solution decreases.

Further, the third repeating unit according to the present invention is derived from the third monomer represented by Chemical Formula 1. Specifically, the third repeating unit is a structural unit of the copolymer, which is formed by introducing the monomer represented by Chemical Formula 1 during polymerization. When the copolymer according to the present invention includes the third repeating unit at a specific level, polymerization stability during the polymerization process may be improved, and at the same time, adhesive strength of the mixture layer including the same with respect to the electrode may be improved, as described above.

Preferably, in Chemical Formula 1, Y is methylene and Z is an oxygen atom.

For example, the monomer represented by Chemical Formula 1 is sodium 3-allyloxy-2-hydroxypropyl sulfonate represented by the following Chemical Formula 1-1:

[Chemical Formula 1-1]

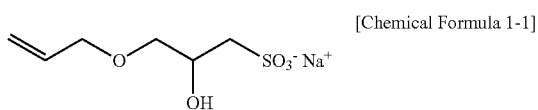

Meanwhile, the copolymer according to the present invention has a latex particle shape prepared through emulsion polymerization. Specifically, the copolymer may be a latex particle having an average particle diameter of 40 nm to 500 nm. The average particle diameter of the latex particle may be determined by dynamic light scattering using a particle size analyzer (NICOMP AW380, manufactured by PSS).

Specifically, in the present invention, the average particle diameter means the arithmetic average particle diameter in the particle diameter distribution as determined by dynamic light scattering. In this regard, the arithmetic average particle diameter may be determined by intensity distribution average particle diameter, volume distribution average particle diameter, or number distribution average particle diameter, and preferably determined by intensity distribution average particle diameter.

For example, the copolymer may be a latex particle having an average particle diameter of 40 nm or more, or 70 nm or more, or 100 nm or more, and 500 nm or less, or 400 nm or less, or 300 nm or less, or 200 nm or less. When the average particle diameter of the latex particle is too small, stability of the latex particle may decrease. On the contrary, when the average particle diameter of the latex particle is too large, adhesive strength of the mixture layer including the same with respect to the current collector may decrease. From this point of view, the copolymer is preferably a latex particle having an average particle diameter in the above-described range.

Further, the copolymer may have a gel content of 95% or more, as calculated by the following Equation 1:

Gel content (%)=$M_b/M_a$*100    [Equation 1]

in Equation 1, $M_a$ is a weight measured after drying the copolymer sample at 80° C. for 24 hours, and $M_b$ is a weight of the copolymer remaining in a 200 mesh, after immersing the weighed copolymer in 50 g of THF (Tetrahydrofuran) for 24 hours or more, passing the copolymer through the 200 mesh, and then drying both the mesh and the copolymer r at 80° C. for 24 hours.

The gel content of the copolymer, which indicates the degree of crosslinking of the copolymer, is calculated by Equation 1 and expressed as a percentage of insoluble fraction. Preferably, the gel content of the copolymer is 95% to 99%, or 95% to 98%, or 96% to 97.5%. When the gel content of the copolymer is less than 95%, swelling in an electrolytic solution may increase, and thus lifespan of a battery may decrease.

Further, coagulum measured after putting 150 g of the latex particle-shaped copolymer in a container, applying shear stress thereto at 3000 rpm for 10 minutes, and passing the copolymer through a 200 mesh may be 200 ppm or less, or 150 ppm or less, or 130 ppm or less, and 180-degree peel strength between a current collector and an electrode mixture prepared by using the copolymer as a binder may be 27 g/in or more, or 28 g/in or more, or 30 g/in or more and 50 g/in or less, or 48 g/in or less, or 45 g/in or less.

Further, the binder composition for a secondary battery electrode may further include an aqueous solvent, in addition to the above-described copolymer, i.e., the latex particle.

In terms of controlling the stability and viscosity of the latex particle, the aqueous solvent may be used in an amount of about 50 parts by weight to about 1,000 parts by weight, preferably about 50 parts by weight to about 200 parts by weight with respect to 100 parts by weight of the copolymer, for example, the aqueous solvent may be used such that a total solid content (TSC) is controlled to about 10% to about 60% based on the total weight of the binder composition.

When the aqueous solvent is used in an excessively small amount, there is a problem in that stability of the latex particles may decrease, and when the aqueous solvent is used in an excessively large amount, there is a problem in that viscosity is decreased, and the adhesive strength of the binder may become weak, leading to deterioration in the performance of a battery.

Meanwhile, according to another aspect of the present invention, provided is a method of preparing the binder composition for a secondary battery electrode, the method including the step of:

preparing the copolymer by performing emulsion polymerization of the aliphatic conjugated diene-based first monomer; one or more second monomers selected from the group consisting of the aromatic vinyl-based monomer, the alkyl (meth)acrylic acid ester-based monomer, the (meth)acrylamide-based monomer, the alkenyl cyanide monomer, and the unsaturated carboxylic acid-based monomer; and the third monomer represented by Chemical Formula 1 in the presence of an emulsifier and a polymerization initiator, wherein the third monomer is used in an amount of 0.5% by weight to 0.95% by weight with respect to the total amount of the first monomer, the second monomer, and the third monomer.

In this regard, the first monomer, the second monomer, and the third monomer are the same as described above.

Further, the emulsion polymerization may be performed by single-stage polymerization or multi-stage polymerization. Here, the single-stage polymerization means a method of simultaneously polymerizing the used monomers in a single reactor, and the multi-stage polymerization means a method of sequentially polymerizing the used monomers in two stages or more.

Further, the emulsion polymerization may be performed in a solution containing the above-described aqueous solvent in the presence of an emulsifier and a polymerization initiator.

A polymerization temperature and a polymerization time of the emulsion polymerization for the preparation of the copolymer may be appropriately determined according to circumstances. For example, the polymerization temperature may be about 50° C. to about 200° C., and the polymerization time may be about 0.5 hr to about 20 hr.

The polymerization initiator applicable in the emulsion polymerization may be an inorganic or organic peroxide. For example, a water-soluble initiator including potassium persulfate, sodium persulfate, ammonium persulfate or the like, or an oil-soluble initiator including cumene hydroperoxide, benzoyl peroxide or the like may be used.

Together with the polymerization initiator, an activating agent may be further used in order to accelerate a reaction initiation of peroxide. The activating agent may be one or more selected from the group consisting of sodium formaldehyde sulfoxylate, sodium ethylenediamine tetraacetate, ferrous sulfate, and dextrose.

Further, the emulsifier for the emulsion polymerization may be an anionic emulsifier including sodium dodecyl diphenyl ether disulfonate, sodium lauryl sulfate, sodium dodecyl benzene sulfonate, dioctyl sodium sulfosuccinate, etc., or a non-ionic emulsifier including polyethyleneoxide alkyl ether, polyethyleneoxide alkyl aryl ether, polyethyleneoxide alkyl amine, polyethyleneoxide alkyl ester, etc., such as polyoxyethylene lauryl ether. The emulsifier is a material having a hydrophilic group and a hydrophobic group at the same time, and it forms a micelle structure during the emulsion polymerization process. Inside the micelle structure, polymerization of each monomer may occur. Preferably, the anionic emulsifier and the non-ionic emulsifier may be used alone or in a mixture of two or more thereof. Use of a mixture of the anionic emulsifier and the non-ionic emulsifier is more effective, but the present invention is not limited to the kind of the emulsifier.

The emulsifier may be used, for example, in an amount of about 0.01 part by weight to about 10 parts by weight, about 1 part by weight to about 10 parts by weight, or about 3 parts by weight to about 5 parts by weight with respect to total 100 parts by weight of the monomer components used in the preparation of the copolymer.

(Electrode Mixture and Electrode)

Meanwhile, according to still another aspect of the present invention, provided is a secondary battery electrode mixture including the above-described binder composition for a secondary battery electrode and an electrode active material.

According to still another aspect of the present invention, provided is a secondary battery electrode including an electrode mixture layer including the secondary battery electrode mixture; and an electrode current collector.

The electrode active material and the electrode current collector used in the electrode mixture and the electrode of the present invention, except for the above-described binder, may include components generally known in the art, respectively.

For example, the electrode mixture may be used in the preparation of a negative electrode. In other words, the electrode mixture may be a negative electrode mixture, and the electrode active material may be a negative electrode active material.

Here, the binder may be included in an amount of 1% by weight to 10% by weight, specifically, 1% by weight to 5% by weight based on the total weight (100% by weight) of the negative electrode mixture. When satisfying this range, the content of the negative electrode active material may be relatively increased, and discharge capacity of the electrode may be further enhanced.

Meanwhile, since the binder is excellent in the characteristics of binding strength, mechanical properties, etc., the binder may maintain binding strength between the negative electrode active material and the negative electrode active material or between the negative electrode active material and the negative electrode current collector, when a graphite-based negative electrode active material is used as the negative electrode active material of the negative electrode mixture or even when a negative electrode active material having higher capacity than the graphite-based negative electrode active material is used, and the binder may prevent expansion of the negative electrode active material due to its own mechanical property.

As described, the binder is suitable for application not only with the graphite-based negative electrode active material but also with the negative electrode active material with higher capacity, and thus the kind of the negative electrode active material is not particularly limited in one embodiment of the present invention.

Specifically, the negative electrode active material may be carbon such as non-graphitized carbon, graphitized carbon, etc.; metal composite oxides such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me': Al, B, P, Si, Group I, II or III elements of the periodic table, halogen; $0 < x \leq 1$; $1 \leq y \leq 3$; $1 \leq z \leq 8$), etc.; lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, etc.; conductive polymers such as polyacetylene, etc.; Li—Co—Ni-based materials; titanium oxide; lithium titanium oxide, etc.

The negative electrode current collector is generally fabricated in a thickness of 3 μm to 500 μm. The negative electrode current collector is not particularly limited, as long as it has conductivity without causing chemical changes in the battery. For example, copper, stainless steel, aluminum, nickel, titanium, sintered carbon, and copper or stainless steel having a surface treated with carbon, nickel, titanium, or silver, aluminum-cadmium alloys, etc. may be used. The negative electrode current collector may also be processed to form fine irregularities on the surface thereof so as to enhance adhesive strength to the negative electrode active material. The negative electrode current collector may be used in various forms including films, sheets, foils, nets, porous structures, foams, non-woven fabrics, etc.

The negative electrode may be fabricated by applying the electrode mixture including the negative electrode active material and the binder onto the negative electrode current collector, followed by rolling. If necessary, the negative electrode may be fabricated by further adding a conductive material, a filler, etc.

The conductive material is used to impart conductivity to the electrode, and any conductive material is used, as long as it is an electronic conductive material without causing chemical changes in the battery. Examples thereof may include conductive materials including carbon-based materials such as natural graphite, artificial graphite, carbon black, acetylene black, Ketjen black, carbon fibers, etc.; metal-based materials such as a metal powder such as copper, nickel, aluminum, silver, etc., or a metal fiber, etc.; a conductive polymer such as a polyphenylene derivative, etc.; or a mixture thereof.

The filler is a component optionally used to inhibit expansion of the negative electrode. The filler is not particularly limited, as long as it is a fibrous material without causing chemical changes in the battery. For example, olefinic polymers such as polyethylene, polypropylene, etc.; and fibrous materials such as glass fibers, carbon fibers, etc. may be used.

Meanwhile, the electrode mixture is not limited to the preparation of the negative electrode, and may be used in the preparation of a positive electrode. In other words, the electrode mixture may be a positive electrode mixture, and the electrode active material may be a positive electrode active material.

The positive electrode active material may include a layered compound such as a lithium cobalt oxide ($LiCoO_2$), lithium nickel oxide ($LiNiO_2$) etc., or a compound substituted with one or more transition metals; lithium manganese oxide such as Chemical formula of $Li_{1+x}Mn_{2-x}O_4$ (wherein x is 0 to 0.33) $LiMnO_3$, $LiMn_2O_3$, $LiMnO_2$, etc.; lithium copper oxide ($Li_2CuO_2$); vanadium oxides such as $LiV_3O_8$, $LiFe_3O_4$, $V_2O_5$, $Cu_2V_2O_7$, etc.; a Ni site type lithium nickel oxide represented by Chemical formula of $LiNi_{1-x}M_xO_2$ (wherein M is Co, Mn, Al, Cu, Fe, Mg, B or Ga, and x is 0.01 to 0.3); a lithium manganese complex oxide represented by chemical formula of $LiMn_{2-x}M_xO_2$ (wherein M is Co, Ni, Fe, Cr, Zn or Ta, and x is 0.01 to 1) or $Li_2Mn_3MO_8$ (wherein M is Fe, Co, Ni, Cu or Zn); lithium manganese complex oxide of a spinel structure, represented by $LiNi_xMn_{2-x}O_4$; $LiMn_2O_4$ where some Li is substituted with alkaline earth metal ions; disulfide compounds; $Fe_2(MoO_4)_3$, etc., but is not limited thereto.

The positive electrode current collector is generally fabricated in a thickness of 3 μm to 500 μm. The positive electrode current collector is not particularly limited, as long as it has high conductivity without causing chemical changes in the battery. For example, stainless steel, aluminum, nickel, titanium, sintered carbon, and aluminum or stainless steel having a surface treated with carbon, nickel, titanium, silver, etc. may be used. The current collector may also be processed to form fine irregularities on the surface thereof so as to enhance adhesive strength to the positive electrode active material. The collector may be used in various forms including films, sheets, foils, nets, porous structures, foams, non-woven fabrics, etc.

The conductive material for the positive electrode is not particularly limited, as long as it has conductivity without causing chemical changes in the battery. For example, conductive materials including graphite such as natural or artificial graphite; carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; polyphenylene derivatives, etc. may be used.

Of the negative electrode and the positive electrode, any electrode in which the above-described binder is not used may employ a binder generally known. Representative examples thereof may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc., but are not limited thereto.

The negative electrode or the positive electrode may be fabricated by mixing each active material and the binder, optionally, a conductive material, and a filler in a solvent to prepare an electrode mixture in a slurry phase, and applying this electrode mixture onto each electrode current collector. This method of fabricating the electrode is widely known in the art, and a detailed description thereof will be omitted in the present description.

(Battery)

Meanwhile, according to still another aspect of the present invention, provided is a secondary battery including the secondary battery electrode. Such a battery may be specifically in the form of including a positive electrode; an electrolyte; and a negative electrode.

The secondary battery may be embodied in a lithium secondary battery.

The lithium secondary battery may be fabricated by impregnating an electrode assembly including a positive electrode, a separator, and a negative electrode with a non-aqueous electrolytic solution.

The positive electrode and the negative electrode are the same as described above.

The separator may include any materials used in the common lithium battery as long as it separates the negative electrode from the positive electrode and provides a travel path for lithium ions. In other words, the separator may have a low resistance to ion transportation of electrolyte and an excellent impregnation for the electrolytic solution. For example, it may be selected from glass fiber, polyester, Teflon, polyethylene, polypropylene, polytetrafluoroethylene (PTFE), or a combination thereof. It may have a form of a non-woven fabric or a woven fabric. For example, a polyolefin-based polymer separator such as polyethylene, polypropylene, etc. is mainly used for the lithium ion battery. In order to ensure the heat resistance or mechanical strength, a coated separator including a ceramic component or a polymer material may be used. Optionally, it may have a mono-layered or multi-layered structure.

If necessary, the separator may be coated with a gel polymer electrolyte to increase stability of the battery. Representative examples of the gel polymer may include polyethyleneoxide, polyvinylidene fluoride, polyacrylonitrile, etc.

However, when a solid electrolyte, not the non-aqueous electrolyte, is employed, the solid electrolyte may also serve as the separator.

The non-aqueous electrolyte may be a liquid electrolyte including a non-aqueous organic solvent and lithium salt. The non-aqueous organic solvent serves as a medium for transmitting ions involved in the electrochemical reaction of a battery.

The non-aqueous electrolyte may include a non-aqueous electrolytic solution, an organic solid electrolyte, an inorganic solid electrolyte, etc.

As the non-aqueous electrolyte solution, for example, an aprotic organic solvent such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofurant, 2-methyl tetrahydrofuran, dimethyl sulfoxide, 1,3-dioxolane, 4-methyl-1,3-dioxolane, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propinate, ethyl propionate, and the like may be used.

As the organic solid electrolyte, for example, polyethylene derivatives, polyethylene oxide derivatives, polypropylene oxide derivatives, phosphoric acid ester polymers, polylysine, polyester sulfide, polyvinyl alcohols, polyvinylidene fluoride, and polymers containing ionic dissociation groups or the like may be used.

As inorganic solid electrolyte, for example, nitrides, halides and sulfates of lithium such as $Li_3N$, $LiI$, $Li_5NI_2$, $Li_3N—LiI—LiOH$, $LiSiO_4$, $LiSiO_4—LiI—LiOH$, $Li_2SiS_3$, $Li_4SiO_4$, $Li_4SiO_4—LiI—LiOH$, $Li_3PO_4—Li_2S—SiS_2$ or the like may be used.

The lithium salt is a material that is readily soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate or the like may be used.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolytic solution. If necessary, in order to impart incombustibility, the electrolytic solution may further include halogen-containing solvents such as carbon tetrachloride, ethylene trifluoride, etc. Further, in order to improve high-temperature storage characteristics, the electrolytic solution may further include carbon dioxide gas, and may further include FEC (fluoro-ethylene carbonate), PRS (propene sultone), FPC (fluoro-propylene carbonate), etc.

The lithium secondary battery according to the present invention may be used in a battery cell used as a power source of small devices and may also be used as a unit battery of a medium-to-large battery module including a plurality of battery cells.

Hereinafter, preferred examples will be provided for better understanding of the present invention. However, the following examples are provided only for illustrating the present invention, but the present invention is not limited thereby.

EXAMPLE

Example 1

(1) Preparation of Binder (a) 1,3-butadiene (44 g), (b1) styrene (47.05 g), (b2) methyl methacrylate (5 g), (b5) acrylic acid and itaconic acid (3 g), and (c) sodium 3-allyloxy-2-hydroxypropyl sulfonate (0.95 g) as monomers, and sodium lauryl sulfate and polyoxyethylene lauryl ether (1.3 g) as an emulsifier were added to water containing $NaHCO_3$ as a buffer, and the temperature was raised to 75° C., and then ammonium persulfate was added as a polymerization initiator to allow single polymerization. The reaction was allowed for about 8 hours while maintaining the temperature at 75° C., thereby preparing a binder composition including a copolymer in the form of latex particles. The binder composition of Example 1 thus prepared had a total solid content of 40%, and an average particle diameter of the latex particles was 110 nm, as measured using a particle size analyzer (NICOMP AW380, manufactured by PSS). pH of the binder composition completely polymerized was adjusted to neutral pH (pH 7) using sodium hydroxide.

(2) Preparation of Negative Electrode Mixture

For a negative electrode, natural graphite (96.9 g), acetylene black (0.4 g), the latex particle-shaped binder (1.5 g) for a secondary battery prepared in Example 1, and carboxymethyl cellulose (1.2 g) as a thickener, based on 100 g of the total solid content, were mixed in water as a dispersing medium such that the total solid content was 50% by weight, thereby preparing a negative electrode mixture for the negative electrode in a slurry phase.

(3) Fabrication of Negative Electrode

The negative electrode mixture of Example 1 was applied onto a copper foil in a thickness of 100 micrometer using a comma coater, and then dried in a dry oven at 90° C. for 15 minutes, and then roll-pressed to a total thickness of 70 μm, thereby obtaining a negative electrode of Example 1.

Example 2

(1) Preparation of Binder

Polymerization was performed in the same manner as in Example 1, except that (a) 1,3-butadiene (45 g), (b1) styrene (46.3 g), (b2) methyl methacrylate (5 g), (b5) acrylic acid and itaconic acid (3 g), and (c) sodium 3-allyloxy-2-hydroxypropyl sulfonate (0.7 g) were used as monomers, thereby preparing a binder composition including a copolymer in the form of latex particles having an average particle diameter of 111 nm.

(2) Preparation of Negative Electrode Mixture and Fabrication of Negative Electrode A negative electrode mixture was prepared in the same manner as in Example 1 using the binder of Example 2, instead of the binder of Example 1, and this negative electrode mixture was used to fabricate a negative electrode of Example 2.

Example 3

(1) Preparation of Binder

Polymerization was performed in the same manner as in Example 1, except that (a) 1,3-butadiene (45.2 g), (b1) styrene (46.3 g), (b2) methyl methacrylate (5 g), (b5) acrylic acid and itaconic acid (3 g), and (c) sodium 3-allyloxy-2-hydroxypropyl sulfonate (0.5 g) were used as monomers, thereby preparing a binder composition including a copolymer in the form of latex particles having an average particle diameter of 110 nm.

(2) Preparation of Negative Electrode Mixture and Fabrication of Negative Electrode A negative electrode mixture was prepared in the same manner as in Example 1 using the binder of Example 3, instead of the binder of Example 1, and this negative electrode mixture was used to fabricate a negative electrode of Example 3.

Example 4

(1) Preparation of Binder

Polymerization was performed in the same manner as in Example 1, except that (a) 1,3-butadiene (44 g), (b1) styrene (47.05 g), (b2) methyl methacrylate (5 g), (b5) acrylic acid and itaconic acid (3 g), and (c) sodium 3-allyloxy-2-hydroxypropyl sulfonate (0.95 g) were used as monomers, and sodium lauryl sulfate and polyoxyethylene lauryl ether (0.7 g) were used as an emulsifier, thereby preparing a binder composition including a copolymer in the form of latex particles having an average particle diameter of 151 nm.

(2) Preparation of Negative Electrode Mixture and Fabrication of Negative Electrode A negative electrode mixture was prepared in the same manner as in Example 1 using the binder of Example 4, instead of the binder of Example 1, and this negative electrode mixture was used to fabricate a negative electrode of Example 4.

Example 5

(1) Preparation of Binder

Polymerization was performed in the same manner as in Example 1, except that (a) 1,3-butadiene (45 g), (b1) styrene (46.3 g), (b2) methyl methacrylate (5 g), (b5) acrylic acid and itaconic acid (3 g), and (c) sodium 3-allyloxy-2-hydroxypropyl sulfonate (0.7 g) were used as monomers, and sodium lauryl sulfate and polyoxyethylene lauryl ether (0.7 g) were used as an emulsifier, thereby preparing a binder composition including a copolymer in the form of latex particles having an average particle diameter of 153 nm.

(2) Preparation of Negative Electrode Mixture and Fabrication of Negative Electrode A negative electrode mixture was prepared in the same manner as in Example 1 using the binder of Example 5, instead of the binder of Example 1, and this negative electrode mixture was used to fabricate a negative electrode of Example 5.

Comparative Example 1

(1) Preparation of Binder (a) 1,3-butadiene (42.5 g), (b1) styrene (49.5 g), (b2) methyl methacrylate (5 g), and (b5) acrylic acid and itaconic acid (3 g) as monomers and sodium lauryl sulfate and polyoxyethylene lauryl ether (1.3 g) as an emulsifier were added to water containing $NaHCO_3$ as a buffer, and the temperature was raised to 75° C., and then ammonium persulfate was added as a polymerization initiator to allow single polymerization. The reaction was allowed for about 8 hours while maintaining the temperature at 75° C., thereby preparing a binder composition including a copolymer in the form of latex particles. The binder composition of Comparative Example 1 thus prepared had a total solid content of 40%, and an average particle diameter of the latex particles was 113 nm, as measured using a particle size analyzer (NICOMP AW380, manufactured by PSS). pH of the binder composition completely polymerized was adjusted to neutral pH (pH 7) using sodium hydroxide.

(2) Preparation of Negative Electrode Mixture

For a negative electrode, natural graphite (96.9 g), acetylene black (0.4 g), the latex particle-shaped binder (1.5 g) for a secondary battery prepared in Comparative Example 1, and carboxymethyl cellulose (1.2 g) as a thickener, based on 100 g of the total solid content, were mixed in water as a dispersing medium such that the total solid content was 50% by weight, thereby preparing a negative electrode mixture for the negative electrode in a slurry phase.

(3) Fabrication of Negative Electrode

The negative electrode mixture of Comparative Example 1 was applied onto a copper foil in a thickness of 100 micrometer using a comma coater, and then dried in a dry oven at 90° C. for 15 minutes, and then roll-pressed to a total thickness of 70 μm, thereby obtaining a negative electrode of Comparative Example 1.

Comparative Example 2

(1) Preparation of Binder

Polymerization was performed in the same manner as in Comparative Example 1, except that (a) 1,3-butadiene (42.5 g), (b1) styrene (49.2 g), (b2) methyl methacrylate (5 g), (b5) acrylic acid and itaconic acid (3 g), and (c) sodium 3-allyloxy-2-hydroxypropyl sulfonate (0.3 g) were used as monomers, thereby preparing a binder composition including a copolymer in the form of latex particles having an average particle diameter of 111 nm.

(2) Preparation of Negative Electrode Mixture and Fabrication of Negative Electrode A negative electrode mixture was prepared in the same manner as in Comparative Example 1 using the binder of Comparative Example 2, instead of the binder of Comparative Example 1, and this negative electrode mixture was used to fabricate a negative electrode of Comparative Example 2.

Comparative Example 3

(1) Preparation of Binder

Polymerization was performed in the same manner as in Comparative Example 1, except that (a) 1,3-butadiene (42 g), (b1) styrene (47.1 g), (b2) methyl methacrylate (5 g), (b5) acrylic acid and itaconic acid (2.9 g), and (c) sodium 3-allyloxy-2-hydroxypropyl sulfonate (3 g) were used as monomers, thereby preparing a binder composition including a copolymer in the form of latex particles having an average particle diameter of 110 nm.

(2) Preparation of Negative Electrode Mixture and Fabrication of Negative Electrode A negative electrode mixture was prepared in the same manner as in Comparative Example 1 using the binder of Comparative Example 3, instead of the binder of Comparative Example 1, and this negative electrode mixture was used to fabricate a negative electrode of Comparative Example 3.

Comparative Example 4

(1) Preparation of Binder

Polymerization was performed in the same manner as in Comparative Example 1, except that (a) 1,3-butadiene (41 g), (b1) styrene (47 g), (b2) methyl methacrylate (4 g), (b5) acrylic acid and itaconic acid (3 g), and (c) sodium 3-allyloxy-2-hydroxypropyl sulfonate (5 g) were used as monomers, thereby preparing a binder composition including a copolymer in the form of latex particles having an average particle diameter of 108 nm.

(2) Preparation of Negative Electrode Mixture and Fabrication of Negative Electrode A negative electrode mixture was prepared in the same manner as in Comparative Example 1 using the binder of Comparative Example 4, instead of the binder of Comparative Example 1, and this negative electrode mixture was used to fabricate a negative electrode of Comparative Example 4.

Comparative Example 5

(1) Preparation of Binder (a) 1,3-butadiene (45 g), (b1) styrene (46.7 g), (b2) methyl methacrylate (5 g), (b5) acrylic acid and itaconic acid (3 g), and (c) sodium 3-allyloxy-2-hydroxypropyl sulfonate (0.3 g) as monomers and sodium lauryl sulfate and polyoxyethylene lauryl ether (1.3 g) as an emulsifier were added to water containing $NaHCO_3$ as a buffer, and the temperature was raised to 70° C., and then ammonium persulfate was added as a polymerization initiator to allow polymerization. The reaction was allowed for about 10 hours while maintaining the temperature at 70° C., thereby preparing a binder composition including a copolymer in the form of latex particles. The binder composition of Comparative Example 5 thus prepared had a total solid content of 38%, and an average particle diameter of the latex particles was 110 nm, as measured using a particle size analyzer (NICOMP AW380, manufactured by PSS). pH of the binder composition completely polymerized was adjusted to neutral pH (pH 7) using sodium hydroxide.

(2) Preparation of Negative Electrode Mixture and Fabrication of Negative Electrode A negative electrode mixture was prepared in the same manner as in Comparative Example 1 using the binder of Comparative Example 5, instead of the binder of Comparative Example 1, and this negative electrode mixture was used to fabricate a negative electrode of Comparative Example 5.

The contents of the monomers used in Examples and Comparative Examples are summarized in Table 1 below.

TABLE 1

|  | a (g) | b1 (g) | b2 (g) | b5 (g) | c (g) | Content of monomer (g) |
|---|---|---|---|---|---|---|
| Example 1 | 44 | 47.05 | 5 | 3 | 0.95 | 100 |
| Example 2 | 45 | 46.3 | 5 | 3 | 0.7 | 100 |
| Example 3 | 45.2 | 46.3 | 5 | 3 | 0.5 | 100 |
| Example 4 | 44 | 47.05 | 5 | 3 | 0.95 | 100 |
| Example 5 | 45 | 46.3 | 5 | 3 | 0.7 | 100 |
| Comparative Example 1 | 42.5 | 49.5 | 5 | 3 | 0 | 100 |
| Comparative Example 2 | 42.5 | 49.2 | 5 | 3 | 0.3 | 100 |
| Comparative Example 3 | 42 | 47.1 | 5 | 3 | 2.9 | 100 |
| Comparative Example 4 | 41 | 47 | 4 | 3 | 5 | 100 |
| Comparative Example 5 | 45 | 46.7 | 5 | 3 | 0.3 | 100 |

Experimental Example 1

Latex Stability Test

To examine mechanical stability of the latex particles prepared in Examples and Comparative Examples, 150 g of each latex particle was put in a container using a homogenizer, and its head was submerged and fixed in the latex, and shear stress was applied thereto at 3000 rpm for 10 minutes. The latex was passed through a 200 mesh to measure coagulum, and the results are shown in Table 2 below.

Experimental Example 2

Gel Content Test

The gel contents of the binders prepared in Examples and Comparative Examples were calculated using the above-described Equation 1. In detail, a predetermined amount of each binder was dried at 80° C. for 24 hours, and then about 0.5 g thereof was taken and accurately weighed. This weight was taken as $M_a$ of Equation 1. Thereafter, the binder thus weighed was put in 50 g of THF (Tetrahydrofuran) for 24 hours. Then, the binder in THF was passed through a 200 mesh of which weight had been known, and the mesh and the copolymer remaining in the mesh were dried at 80° C. for 24 hours. The weights of the mesh and the copolymer remaining in the mesh were measured, from which the weight of 200 mesh was subtracted, and the resulting value was taken as $M_b$, which is the weight of the copolymer remaining in the mesh.

In this regard, the gel content of each binder was obtained as an average value for three or more samples per binder, and the results are shown in Table 2 below.

Experimental Example 3

Electrode Adhesive Strength Test

To measure adhesive strength between an electrode mixture and a current collector when the binder according to the present invention is used, each surface of the positive electrodes and the negative electrodes fabricated in Examples and Comparative Examples was cut and fixed on a slide glass, and then 180-degree peel strength was measured while peeling the current collector therefrom. After measuring the peel strength for each electrode five times or more, the average value was obtained, and the results are shown in Table 2 below.

TABLE 2

|  | Content of third monomer(c) (%)* | Coagulum of latex stability test (ppm) | Gel content (%) | Adhesive strength to negative electrode (g/in) |
|---|---|---|---|---|
| Example 1 | 0.95 | 55 | 97.0 | 30.3 |
| Example 2 | 0.7 | 78 | 97.1 | 33.1 |
| Example 3 | 0.5 | 121 | 97.1 | 34.5 |
| Example 4 | 0.95 | 38 | 96.9 | 41.1 |
| Example 5 | 0.7 | 44 | 96.9 | 42.0 |
| Comparative Example 1 | 0 | 557 | 96.4 | 26.7 |
| Comparative Example 2 | 0.3 | 280 | 96.5 | 26.5 |
| Comparative Example 3 | 2.9 | 91 | 96.8 | 19.8 |
| Comparative Example 4 | 5 | 157 | 97.7 | 11.7 |
| Comparative Example 5 | 0.3 | 3652 | 91.3 | 37.1 |

*based on the total content of used monomers

Referring to Table 2, it was confirmed that the latex particles according to Examples of the present invention may exhibit excellent mechanical stability, and may also improve adhesive strength of the mixture layer employing the latex particle as the binder with respect to the negative electrode current collector. In contrast, the latex particles of Comparative Examples, in which sodium 3-allyloxy-2-hydroxypropyl sulfonate as the third monomer was not used or was used in an amount of less than 0.5% by weight or in an amount of more than 0.95% by weight based on the total amount of the monomers, had low mechanical stability, and thus were not easy to apply on the current collector in the form of slurry, or adhesive strength of the mixture layer employing the latex particle as the binder with respect to the negative electrode current collector was low, causing defects on the electrode.

Accordingly, since the electrode binder composition according to one embodiment of the present invention includes the copolymer which is the latex particle showing excellent latex stability, it is easy to apply on the current collector in the form of slurry, and the electrode mixture prepared by using the electrode binder composition has the excellent binding strength with respect to the current collector. Therefore, it is expected that performance of a secondary battery may be greatly improved.

What is claimed is:

1. A binder composition for a secondary battery electrode, the binder composition comprising a copolymer,
the copolymer including: a) a first repeating unit derived from an aliphatic conjugated diene-based first monomer;
a second repeating unit derived from three or more second monomers selected from the group consisting of b1) an aromatic vinyl-based monomer, b2) an alkyl (meth)acrylic acid ester-based monomer, and b5) an unsaturated carboxylic acid-based monomer; and
c) a third repeating unit derived from a third monomer represented by the following Chemical Formula 1,
wherein the third repeating unit is included in an amount of 0.5% by weight to 0.95% by weight with respect to the total amount of the first repeating unit, the second repeating unit, and the third repeating unit,

[Chemical Formula 1]

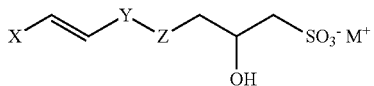

in Chemical Formula 1,
M is an alkali metal,
X is hydrogen or a methyl group,
Y is alkylene having 1 to 10 carbon atoms, and
Z is an oxygen atom or NR, wherein R is hydrogen or an alkyl group having 1 to 10 carbon atoms,
wherein the first repeating unit is included in an amount of 0.1% by weight to 60% by weight with respect to the total amount of the first repeating unit, the second repeating unit, and the third repeating unit.

2. The binder composition for a secondary battery electrode of claim 1,
wherein the first monomer is one or more selected from the group consisting of 1,3-butadiene, 2-methyl-1,3-butadiene, 2,3-dimethyl-1,3-butadiene, 1,2-dimethyl-1,3-butadiene, 1,4-dimethyl-1,3-butadiene, 1-ethyl-1,3-butadiene, 2-phenyl-1,3-butadiene, 1,3-pentadiene, 3-methyl-1,3-pentadiene, 4-methyl-1,3-pentadiene, 2,4-dimethyl-1,3-pentadiene, 3-ethyl-1,3-pentadiene, and 1,3-hexadiene.

3. The binder composition for a secondary battery electrode of claim 1,
wherein the second repeating unit is included in an amount of 39% by weight to 99.4% by weight with respect to the total amount of the first repeating unit, the second repeating unit, and the third repeating unit.

4. The binder composition for a secondary battery electrode of claim 1,
wherein in Chemical Formula 1,
Y is methylene, and
Z is an oxygen atom.

5. The binder composition for a secondary battery electrode of claim 1,
wherein the copolymer has a gel content of 95% or more, as calculated by the following Equation 1:

Gel content (%)=$M_b/M_a$*100    [Equation 1]

in Equation 1,
$M_a$ is a weight measured after drying the copolymer at 80° C. for 24 hours, and
$M_b$ is a weight of the copolymer remaining in a 200 mesh after immersing the weighed copolymer in 50 g of Tetrahydrofuran (THF) for 24 hours or more, passing the copolymer through the mesh, and then drying both the mesh and the copolymer at 80° C. for 24 hours.

6. The binder composition for a secondary battery electrode of claim 1,
wherein the copolymer is a latex particle having an average particle diameter of 40 nm to 500 nm.

7. The binder composition for a secondary battery electrode of claim 1,
further comprising an aqueous solvent.

8. The binder composition for a secondary battery electrode of claim 7,
wherein the aqueous solvent is included in an amount of 50 parts by weight to 1,000 parts by weight with respect to 100 parts by weight of the copolymer.

9. A method of preparing the binder composition for a secondary battery electrode of claim 1, the method comprising the step of:
preparing the copolymer by performing emulsion polymerization of the aliphatic conjugated diene-based first monomer; the three or more second monomers selected from the group consisting of b1) the aromatic vinyl-based monomer, b2) the alkyl (meth)acrylic acid ester-based monomer, and b5) the unsaturated carboxylic acid-based monomer; and the third monomer represented by Chemical Formula 1 in the presence of an emulsifier and a polymerization initiator,
wherein the third monomer is used in an amount of 0.5% by weight to 0.95% by weight with respect to the total amount of the first monomer, the second monomer, and the third monomer.

10. The method of claim 9,
wherein the emulsion polymerization is performed by single-stage polymerization or multi-stage polymerization.

11. A secondary battery electrode mixture comprising the binder composition for a secondary battery electrode of claim 1, and an electrode active material.

12. The secondary battery electrode mixture of claim 11, further comprising a conductive material.

13. A secondary battery electrode comprising an electrode mixture layer including the secondary battery electrode mixture of claim 11;
and an electrode current collector.

14. A secondary battery comprising the secondary battery electrode of claim 13.

15. The binder composition for a secondary battery electrode of claim 1,
wherein the second monomer is b1) styrene, b2) methyl methacrylate, and b5) acrylic acid and itaconic acid.

16. The binder composition for a secondary battery electrode of claim 1,
wherein the monomer represented by Chemical Formula 1 is sodium 3-allyloxy-2-hydroxypropyl sulfonate represented by the following Chemical Formula 1-1:

[Chemical Formula 1-1]

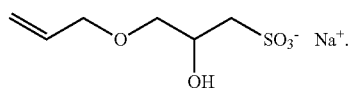

17. The method of claim 9,
wherein the emulsion polymerization is performed in a solution comprising an aqueous solvent.

18. The method of claim 9,
wherein the emulsifier is used in an amount of about 0.01 part by weight to about 10 parts by weight with respect to total 100 parts by weight of the total amount of the first monomer, the second monomer, and the third monomer.

\* \* \* \* \*